March 22, 1949.   N. L. CHATHAM   2,465,197
COUPLING
Filed Aug. 25, 1945
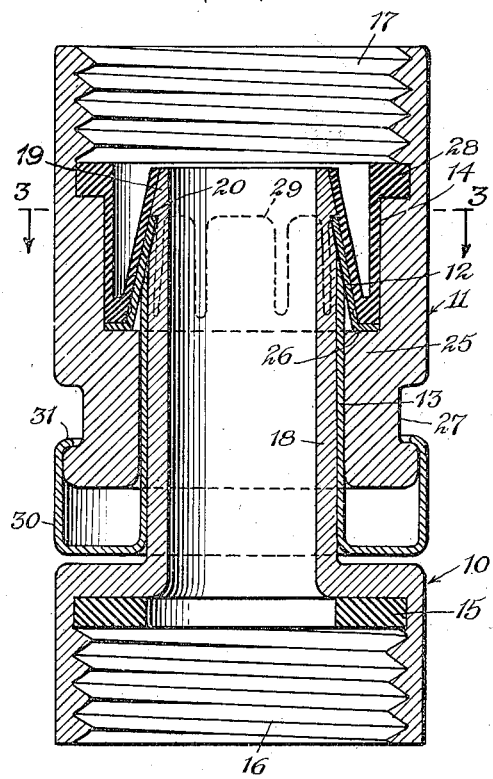
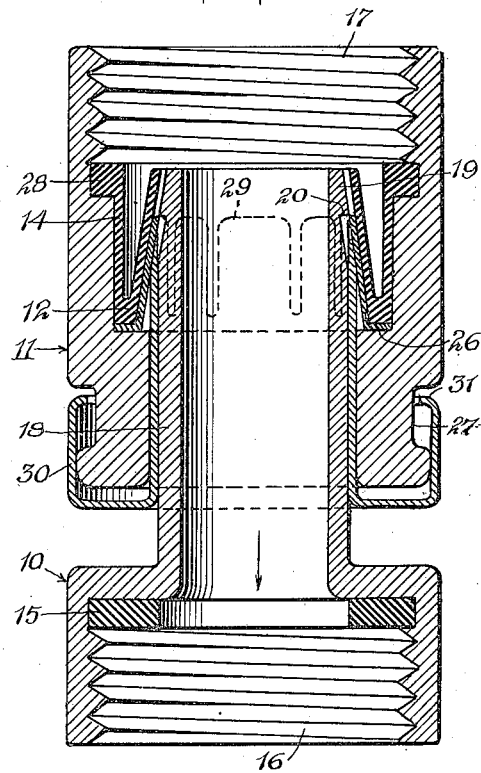
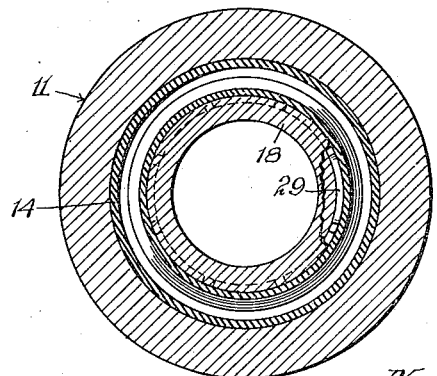
INVENTOR.
Newton L. Chatham
BY
Munn, Liddy & Glaccum
Attorneys

UNITED STATES PATENT OFFICE 2,465,197

COUPLING

Newton L. Chatham, Olean, N. Y.

Application August 25, 1945, Serial No. 612,577

1 Claim. (Cl. 285—190)

This invention relates to quickly detachable couplings.

The principal object of the invention is to provide a coupling for garden hose and air, steam and gas lines and conduits for fluids of every description which may very readily be detached therefrom and which, during use, is completely sealed against water leakage.

It is the further object of this invention to provide a coupling of the character described which may be manufactured and sold at relatively low cost and which may be manufactured and assembled with great ease.

A preferred embodiment of my invention is illustrated in the accompanying drawing, in which—

Fig. 1 is a longitudinal section through said embodiment showing its several parts locked together;

Fig. 2 is a view similar to that of Fig. 1 showing how the releasing member of the device unlocks the several parts thereof from one another;

Fig. 3 is a cross section of the device on the line 3—3 of Fig. 1.

The preferred embodiment of the invention shown in Figs. 1 to 3 of the drawing comprises but six parts, to wit, a screw threaded tubular member 10 removably disposed within a screw threaded sleeve member 11, an annular locking member 12 carried within the sleeve, an annular releasing member 13 slidably disposed between said tubular and sleeve members and a washer 14 sealing the space between said tubular and sleeve members and a second washer 15 carried within said tubular member to seal the space between it and the hose (not shown) to which it is intended to be connected.

It will be noted that the threaded portions 16 and 17, respectively, of the tubular and sleeve members are formed at the opposite ends of said members so that when the two members are joined as shown in the drawing, their threaded portions comprise the opposite ends of the coupling which said members and the other members above mentioned comprise. The non-threaded portion 18 of the tubular member may be of reduced external and internal diameter. It is provided at its free end with a beveled portion 19 terminating in an annular shoulder 20.

The non-threaded end 25 of the sleeve member 11 may also have a reduced inner diameter. It is provided with an annular shelf 26 on its inner surface and an annular groove 27 on its outer surface. The annular locking member 12 is carried within the sleeve member on its annular shelf 26. It is adapted to engage the shoulder 20 of the tubular member 10.

It will be noted in Fig. 1 that the locking member 12 merges with the tapered or beveled portion 19 of the tubular member 10 and that between the inside surface of the sleeve member on the one hand, and the locking member and the tapered portion 19 of the tubular member on the other hand, a substantially V-shaped annular space is formed. It is in this space that the washer 14 is disposed, said washer being substantially V-shaped in cross section. The outer wall of said V-shaped washer is provided with a flange 28 which serves as an ordinary washer sealing the space between the sleeve member 11 and a threaded faucet (not shown) when the former is mounted on the latter.

The locking member 12 is shown in Figs. 1 and 2 to have a plurality of fingers 29, which fingers—as has already been indicated—are disposed to engage the shoulder 20 of the tubular member 10. These fingers, as well as the rest of the locking member, are formed of relatively flexible material such as spring steel.

The releasing member 13 comprises a tubular member having an outwardly, upwardly and inwardly bent lower end 30. The inwardly bent portion 31 thereof is disposed to enter the annular groove 27 of the sleeve member 11. As has already been indicated, this releasing member is slidably disposed between the tubular and sleeve members, the limits of its movement in either direction being determined by the width of the annular groove 27. It will be noted that the upper end of the releasing member 13 is adapted to engage the locking member 12 at the point where said locking member and the tubular member 10 meet. When the releasing member is moved upwardly and against the locking member, the fingers 29 thereof are caused to spread out and to disengage the shoulder 20 of the tubular member 10.

It now becomes clear that when the tubular and sleeve members are brought together, the fingers 29 of the locking member automatically engage the shoulder 20 of the tubular member, thereby preventing separation of the tubular member from the sleeve member. When it is desired to disconnect the tubular from the sleeve member, the bent portion 30 of the releasing member 13 is moved upwardly, thereby bringing the free end of the releasing member against the locking member and causing disengagement of the same from the tubular member. The tubular and sleeve members may now be drawn apart.

The function of the V-shaped space between the two walls of the V-shaped washer 14 is as follows: When water is caused to flow through the coupling it fills said V-shaped space and brings pressure to bear against the walls of said V-shaped washer, forcing them apart, one of them being forced into pressure contact with the inner surface of the sleeve member, the other being forced into pressure contact with the tapered portion 19 of the tubular member and also with the locking member 12. A watertight seal is thereby provided between the sleeve member on the one hand, and the tubular member on the other, and the locking member is locked into place.

A preferred embodiment only of the invention has herein been described. Modifications may be incorporated therein without departing from the basic principles of the invention. For example, the tubular and sleeve members are shown to be threaded internally. Either or both may be threaded externally in accordance with specific needs.

I claim:

A coupling comprising a screw threaded tubular member removably disposed within a screw threaded sleeve member, an annular locking member carried within said sleeve member having spring fingers and positioned to engage an annular shoulder on the tubular member, and an annular releasing member slidably disposed between said tubular and sleeve members and adapted to disengage said spring fingers from said shoulder, said annular releasing member having an annular flange consisting of portions bent outwardly, then upwardly and then inwardly, said inwardly bent portion entering an annular groove in the outer surface of said sleeve member and being limited in its longitudinal movement by the walls of said groove.

NEWTON L. CHATHAM.

REFERENCES CITED

The following references are of record in the file of this patent:

UNITED STATES PATENTS

| Number | Name | Date |
|---|---|---|
| 1,587,079 | Machino | June 1, 1926 |
| 2,111,956 | Baldwin | Mar. 22, 1938 |
| 2,127,086 | McGarth | Aug. 16, 1938 |
| 2,238,706 | Ohls | Apr. 15, 1941 |
| 2,252,240 | Tschappat | Aug. 12, 1941 |
| 2,280,183 | Bennett | Apr. 21, 1942 |